US012731853B2

(12) United States Patent
Pucher et al.

(10) Patent No.: US 12,731,853 B2
(45) Date of Patent: Sep. 8, 2026

(54) BATTERY MODULE, A BATTERY PACK, AN ELECTRIC VEHICLE, A CELL CARRIER, A CELL ASSEMBLY

(71) Applicant: SAMSUNG SDI CO., LTD., Yongin-si (KR)

(72) Inventors: Matthias Pucher, Lebring (AT); Bernhard Hadler, Feldkirchen (AT); Markus Ridisser, Premstätten (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 996 days.

(21) Appl. No.: 17/968,692

(22) Filed: Oct. 18, 2022

(65) Prior Publication Data

US 2023/0121830 A1 Apr. 20, 2023

(30) Foreign Application Priority Data

Oct. 19, 2021 (EP) .................................... 21203348
Oct. 18, 2022 (KR) ........................ 10-2022-0133890

(51) Int. Cl.
*H01M 50/291* (2021.01)
*B60L 50/64* (2019.01)
(Continued)

(52) U.S. Cl.
CPC ........... *H01M 50/291* (2021.01); *B60L 50/64* (2019.02); *H01M 50/213* (2021.01);
(Continued)

(58) Field of Classification Search
CPC ............. H01M 50/291; H01M 50/213; H01M 50/264; H01M 50/505; H01M 2220/20;
(Continued)

(56) References Cited

U.S. PATENT DOCUMENTS 9,172,121 B2 * 10/2015 Güner ............... H01M 10/6555
10,741,889 B2 8/2020 Newman et al.
(Continued)

FOREIGN PATENT DOCUMENTS

CN 102163702 A 8/2011
CN 202352739 U 7/2012
(Continued)

OTHER PUBLICATIONS

European Office Action dated Jan. 8, 2025, issued in European Patent Application No. 21203346.8 (4 pages).
(Continued)

*Primary Examiner* — Michael L Dignan
(74) *Attorney, Agent, or Firm* — WOMBLE BOND DICKINSON (US) LLP

(57) ABSTRACT

A battery module includes: a plurality of battery cells; and a plurality of cell carriers arranged adjacent to each other. Each of the cell carriers includes a plurality of meandering ribs that are spaced apart from each other, a first plurality of cell retainers, and a second plurality of cell retainers. Each of the first plurality and second plurality of cell retainers is configured to hold one of the battery cells in a form locking manner, and the battery cells are in the cell retainers. The first plurality of cell retainers of one of the cell carriers is arranged between the meandering ribs of the one of the cell carriers, and the second plurality of cell retainers of the one of the cell carriers is arranged between one of the meandering ribs of the one of the cell carriers and a meandering rib of an adjacently arranged cell carrier.

18 Claims, 3 Drawing Sheets

(51) Int. Cl.
*H01M 50/213* (2021.01)
*H01M 50/264* (2021.01)
*H01M 50/505* (2021.01)

(52) U.S. Cl.
CPC ....... *H01M 50/264* (2021.01); *H01M 50/505* (2021.01); *H01M 2220/20* (2013.01)

(58) Field of Classification Search
CPC ............. H01M 10/613; H01M 10/625; H01M 10/643; H01M 50/209; H01M 50/224; H01M 50/249; H01M 50/289; H01M 50/503; H01M 50/507; Y02E 60/10; B60L 50/64
See application file for complete search history.

(56) References Cited

U.S. PATENT DOCUMENTS

| | | | | |
|---|---|---|---|---|
| 11,594,772 | B2 * | 2/2023 | Cournoyer | B32B 37/1284 |
| 2011/0206948 | A1 | 8/2011 | Asai et al. | |
| 2014/0212737 | A1 * | 7/2014 | Bae | H01M 10/643 429/176 |
| 2016/0359210 | A1 * | 12/2016 | Hasegawa | H01M 10/6551 |
| 2018/0026243 | A1 | 1/2018 | Stojanovic et al. | |
| 2021/0050635 | A1 | 2/2021 | Lee et al. | |
| 2021/0098765 | A1 | 4/2021 | Weinberger et al. | |
| 2022/0255145 | A1 | 8/2022 | Lee et al. | |

FOREIGN PATENT DOCUMENTS

| | | | | |
|---|---|---|---|---|
| CN | 103700794 | A | 4/2014 | |
| CN | 106104846 | A | 11/2016 | |
| CN | 213546444 | U | 6/2021 | |
| DE | 10 2011 015 621 | A1 | 10/2012 | |
| DE | 10 2017 011 717 | A1 | 5/2018 | |
| EP | 3 273 500 | A1 | 1/2018 | |
| EP | 3 799 148 | A1 | 3/2021 | |
| JP | 2013-110080 | * | 6/2013 | H01M 10/50 |
| JP | 2013-110080 | A | 6/2013 | |
| JP | 2015-191730 | A | 11/2015 | |
| KR | 10-2166635 | B1 | 10/2020 | |
| WO | WO 2019/164974 | A1 | 8/2019 | |

OTHER PUBLICATIONS

Chinese Office Action dated Aug. 25, 2025, issued in corresponding Chinese Patent Application No. 202211278869.3 (8 pages).
Extended European Search Report issued in corresponding application No. EP 21203346.8, dated Apr. 20, 2022, 8 pages.
Chinese Office Action corresponding to Chinese Application No. 202211279175.1, dated Aug. 1, 2025 (8 pages).
US Notice of Allowance dated Aug. 12, 2025, issued in U.S. Appl. No. 17/968,721 (8 pages).
Extended European Search Report issued in corresponding application No. EP 21203348.4, dated Apr. 22, 2022, 8 pages.

* cited by examiner

BATTERY MODULE, A BATTERY PACK, AN ELECTRIC VEHICLE, A CELL CARRIER, A CELL ASSEMBLY

CROSS-REFERENCE TO RELATED APPLICATION

This application claims priority to and the benefit of European Patent Application No. 21203348.4, filed in the European Patent Office on Oct. 19, 2021, and Korean Patent Application No. 10-2022-0133890, filed in the Korean Intellectual Property Office on Oct. 18, 2022, the entire content of both of which are incorporated herein by reference.

BACKGROUND

1. Field

Aspects of embodiments of the present disclosure relate to a battery module, a battery pack including the battery module, an electric vehicle including the battery pack, a cell carrier, and a cell assembly.

2. Description of the Related Art

Recently, vehicles for transportation of goods and peoples have been developed that use electric power as a source for motion. Such an electric vehicle is an automobile that is propelled by an electric motor using energy stored in rechargeable batteries. An electric vehicle may be solely powered by batteries or may be a hybrid vehicle powered by, for example, a gasoline generator or a hydrogen fuel power cell. A hybrid vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric and hybrid vehicles and the like.

Rechargeable batteries may be used as a battery module formed of a plurality of unit battery cells coupled together in series and/or in parallel to provide a high energy content, such as for motor driving of a hybrid vehicle. The battery module may be formed by interconnecting the electrode terminals of the plurality of unit battery cells in a manner depending on a desired amount of power and to realize a high-power rechargeable battery.

Battery modules can be constructed either in a block design or in a modular design. In the block design, each battery is coupled to a common current collector structure and a common battery management system, and the unit thereof is arranged in a housing. In the modular design, pluralities of battery cells are connected together to form submodules, and several submodules are connected together to form the battery module. In automotive applications, battery systems generally include a plurality of battery modules connected together in series to provide a desired voltage. The battery modules may include submodules with a plurality of stacked battery cells, and each stack includes cells connected in parallel that are, in turn, connected in series (XpYs) or cells connected in series that are, in turn, connected in parallel (XsYp).

A battery pack is a set of any number of (usually identical) battery modules. The battery modules may be configured in series, parallel, or a mixture of both to deliver the desired voltage, capacity, and/or power density. Components of a battery pack include the individual battery modules and the interconnects, which provide electrical conductivity between the battery modules.

The mechanical integration of such a battery system requires suitable mechanical connections between the individual components, for example, between battery cells, the battery management system (BMS), and the housing. These connections must remain functional and safe throughout the average service life of the battery system. Further, installation space and interchangeability requirements must be met, especially in mobile applications.

Conventional battery systems, despite any modular structure, usually include a battery housing that acts as an enclosure to seal the battery system against the environment and while providing structural protection of the battery system's components. Housed battery systems are generally mounted as a whole (e.g., as a unit) into their application environment, such as into an electric vehicle. Thus, the replacement of defective system parts, such as a defect battery submodule, requires dismounting the whole battery system and removal of the housing. Even defects in small and/or cheap system parts may require dismounting and replacement of the entire battery system or its separate repair. Because high-capacity battery systems are expensive, large, and heavy, such a service procedure is burdensome and the storage of the bulky battery systems, such as in a workshop, is difficult.

In conventional battery modules and/or battery packs, cylindrical cells are fixed with a top and/or bottom plastic carrier. An expandable adhesive is sometimes used to fix the cells. Both assemblies, however, require rather large subassemblies and generally are not modular. Such large subassemblies are difficult to handle during manufacturing and large manufacturing areas are needed, including to perform laser welding to connect battery cells and a current collector structure with each other.

SUMMARY

The present disclosure is defined by the appended claims and their equivalents. The description that follows is subject to this limitation. Any disclosure lying outside the scope of the claims and their equivalents is intended for illustrative as well as comparative purposes.

According to one embodiment of the present disclosure, a battery module includes: a plurality of battery cells; and a plurality of (e.g., at least two) cell carriers. The cell carriers are arranged adjacent to each other, and each of the cell carriers includes a first plurality of cell retainers and a second plurality of cell retainers. Each of the cell retainers is configured to hold one of the battery cells in a form locking manner. The plurality of battery cells is arranged in the cell retainers, and each of the cell carriers includes a plurality of (e.g., at least two) meandering ribs that are spaced apart from each other. The first plurality of cell retainers of one of the cell carriers is arranged between the meandering ribs of said cell carrier, and the second plurality of cell retainers of said cell carrier is arranged between one of the meandering ribs of said cell carrier and a meandering rib of an adjacently arranged cell carrier.

According to another embodiment of the present disclosure, a battery pack is provided, including a plurality of battery modules as described above.

Another embodiment of the present disclosure refers to an electric vehicle including at least one battery module as described above and/or at least one battery pack as described above.

Another embodiment of the present disclosure refers to a cell carrier, including a first plurality of cell retainers and a second plurality of cell retainers. Each of the cell retainers is configured to hold a battery cell in a form locking manner and includes a plurality of (e.g., at least two) meandering ribs that are spaced apart from each other. The first plurality of cell retainers of the cell carrier is arranged between the meandering ribs of said cell carrier, and the second plurality of cell retainers of said cell carrier is arranged opposite to the first plurality of cell retainers and is separated therefrom by one of the meandering ribs.

Another embodiment of the present disclosure refers to a cell assembly including: the cell carrier; a plurality of battery cells; and a busbar. The plurality of battery cells is arranged in the cell retainers, and the plurality of cells is electrically interconnected by the busbar.

Further aspects and features of the present disclosure can be learned from the dependent claims and/or the following description.

BRIEF DESCRIPTION OF THE DRAWINGS

Aspects and features of the present disclosure will become apparent to those of ordinary skill in the art by describing, in detail, embodiments thereof with reference to the attached drawings, in which.

DETAILED DESCRIPTION

Figure 1:
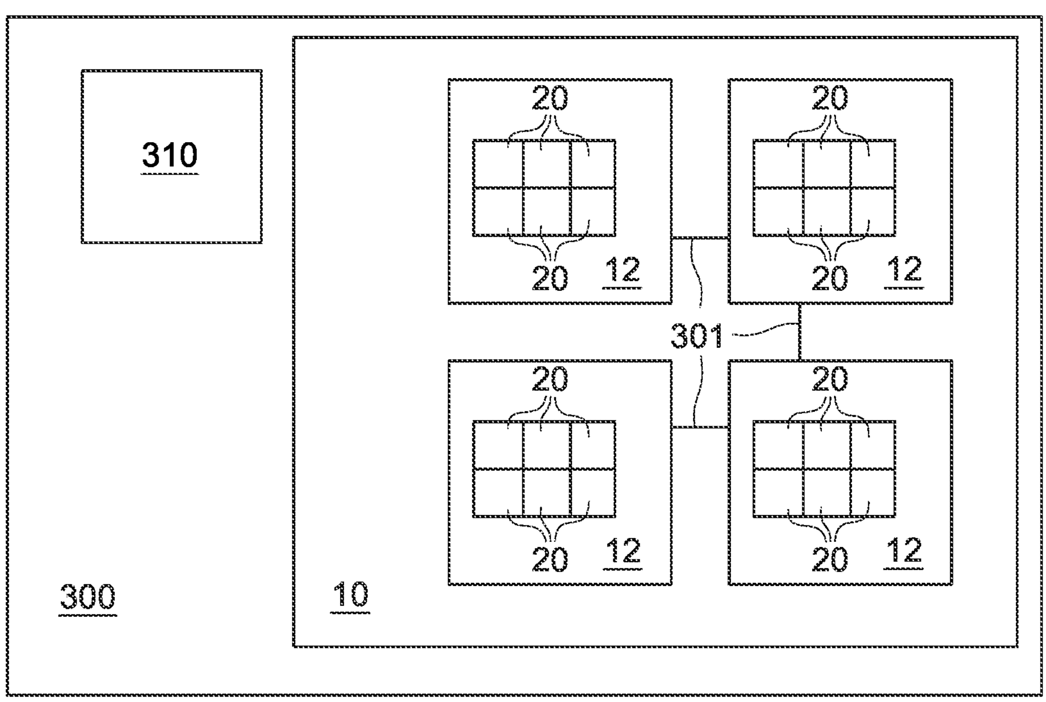
FIG. 1 is a schematic view of an electric vehicle according to an embodiment of the present disclosure.

Reference will now be made, in detail, to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions are omitted.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

According to one embodiment of the present disclosure, a battery module includes a plurality of battery cells and a plurality of (e.g., at least two) cell carriers. The cell carriers are arranged adjacent to each other (e.g., side-by-side). The battery module may include any number of cell carriers to retain a desired number of battery cells. Each of the cell carriers includes a first plurality of cell retainers and a second plurality of cell retainers. The first plurality of cell retainers and the second plurality of cell retainers are distinguishable from each other by their arrangement. The first plurality of cell retainers is arranged in a first row, and the second plurality of cell retainers is arranged in a second row. The first and second row are separated by a rib. The first plurality of cell retainers and the second plurality of cell retainers are also referred to as cell retainers. Each of the cell retainers is configured to hold (or retain) one or more of the battery cells in a form locking manner. For example, the cell retainers and the battery cells have corresponding shapes (e.g., shapes that match in the sense that the battery cells are retainable in a fixed manner in the cell retainers). The plurality of battery cells is arranged in the cell retainers.

Each of the cell carriers includes at least two meandering ribs that are spaced apart from each other. For example, the ribs each have a meandering shape, which can be referred to as an undulating shape. Each of the ribs basically (or generally) extends in a principal extension plane while alternatingly meandering (or undulating) to either of the two opposite sides with respect the principal extension plane. The first plurality of cell retainers of one of the cell carriers is arranged between the at least two meandering ribs of said cell carrier. The second plurality of cell retainers of said cell carrier is arranged between one of the at least two meandering ribs and a meandering rib of an adjacently arranged cell carrier. For example, the second plurality of cell retainers is separated from the first plurality of cell retainers by either the first meandering rib or the second meandering rib.

The battery module may modularly configured by using the cell carriers that are arranged adjacent to each other. Each of the cell carriers and the plurality of battery cells form a sub-module. Therefore, small sub-modules can be manufactured and accordingly arranged to manufacture the entire battery module. These sub-modules are efficient to handle and require only small manufacturing sites. The sub-modules are modular in size and easy to handle and, thus, assembling tolerances can be reduced compared to an example in which all of the battery cells of the entire battery module need to be equipped with a current collector structure at the same manufacturing site by, for example, laser welding. The modular design enables a smaller number of battery cells corresponding to the number of battery cells in a cell carrier to be electrically interconnected by a current collector structure, such as a busbar. A plurality of cell carriers can be arranged adjacent to each other to form the battery module. The sub-modules are electrically interconnected by an interconnection arrangement, for example, by screwing. Thus, the battery module can easily be dismounted, such as for service and maintenance, and welding can be used for the cell assemblies and while being avoided for the entire battery module.

In some embodiments, the at least two ribs of each one of the cell carriers are arranged so that the first plurality of cell retainers of said cell carriers is meanderingly arranged between said at least two ribs. Thus, in addition to the ribs being arranged in a meandering manner, the first plurality of cell retainers is accommodated by the cell carrier in a meandering manner between the at least two meandering ribs. This may be provided by the ribs having an essentially equal or periodically changing width. This enables an efficient arrangement of the first plurality of cell retainers.

In some embodiments, the at least two ribs of each one of the cell carriers are arranged so that the second plurality of cell retainers of said cell carriers is meanderingly arranged between one of said at least two ribs and the meandering rib of an adjacently arranged cell carrier. In addition to the ribs being arranged in a meandering manner, the second plurality of cell retainers is accommodated by one of the cell carriers between one of the at least two ribs and a meandering rib of an adjacently arranged cell carrier in a meandering manner. Additionally or alternatively, the at least two ribs of each one of the cell carriers are arranged so that the second plurality of cell retainers of said cell carriers is meanderingly arranged opposite to the first plurality of cell retainers and is separated therefrom (e.g., is separated or spaced apart from the first plurality of cell retainers) by one of the at least two meandering ribs. For example, the second plurality of cell retainers is accommodated by the cell carrier so that said meandering rib separates the first plurality of cell retainers and the second plurality of cell retainers. This enables an efficient arrangement of the second plurality of cell retainers.

In some embodiments, the plurality of battery cells is arranged in a hexagonal pattern and/or each of the first and second plurality of cell retainers is arranged in a meandering row so that a plurality of adjacently arranged rows form a hexagonal arrangement of cell retainers. The hexagonal pattern may also be called a honeycomb pattern. In the hexagonal pattern, the cell retainers are surrounded (e.g., surrounded in a plan view) in a regular pattern by six neighboring cell retainers of the cell carriers and/or of the battery module. The arrangement of the battery cell retainers in a hexagonal pattern provides a particularly space-saving construction of the battery module and an efficient packing of cylindrical battery cells in the battery module.

In some embodiments, each of the cell carriers is stackable and the battery module is built by using stacked cell carriers. For example, the cell carriers are shaped and/or configured to be arranged next to each other without leaving major construction space empty. For example, an effective arrangement of cell retainers can imply that neighboring cell carriers can be arranged next to each other in a stacked manner without leaving a gap between battery cells that are retained within the cell retainers. In some embodiments, the cell carriers include mechanical connection members that are configured to guide neighboring cell carriers during manufacturing so that the neighboring cell carriers are effectively arranged next to each other and configured to mechanically hold the neighboring cell carriers next to each other in the mounted state. This enables the adjacently arranged cell carriers to be arranged adjacent to each other in a stacked manner to provide a modular construction of the battery module.

In some embodiments, each of the battery cells is cylindrically shaped and/or each of the cell retainers is at least partly cylindrically shaped and/or has a cylindrical through-hole (e.g., an opening) to provide an embodiment that is efficient to manufacture. The cylindrical shape allows an effective and simple arrangement of cylindrically shaped battery cells within the cell retainers. A cylindrical through-hole enables efficient mounting of the battery cells by inserting the battery cells into the through-hole at one end of the through-hole while the battery cells are accessible at an opposite end of the through-hole to provide electrical connection. Alternatively or additionally, the cell-retainers may have the shape of a cylinder segment and/or adjacent cell retainers can be connected with each other, in particular, adjacent cell retainers within one row can be connected with each other. In some embodiments, each of the retainers includes a ring-shaped projection to prevent the battery cells held therein from moving.

In some embodiments, each of the cell carriers includes an even number of cell retainers. This enables effective arrangement of battery cells within the battery module as a plurality of cell carriers are arranged adjacent to each other. When each of the cell carriers has an even number of cell retainers, construction space within a battery module can be efficiently used to arrange the battery cells. The even number of cell retainers allows for a particular efficient manufacture of a plurality of cell assemblies as busbars to electrically interconnect the battery cells retained in the cell retainers are identical for each of the cell assemblies.

In some embodiments, each of the cell carriers includes 10, 14, or 18 cell retainers. Thus, each cell carrier can retain 10, 14, or 18 battery cells to balance the requirements of an efficient packing and manufacture while making use of the modular construction of the battery module.

In some embodiments, two or more of the battery cells retained in one of the cell carriers are electrically interconnected by a busbar. The busbar may be welded to electrically interconnect said battery cells. In some embodiments, each of the battery cells retained in one of the cell carriers are electrically interconnected by the same busbar. Such an embodiment enables an electrical interconnection between the battery cells that is also modularized by providing cell assemblies with an electrical interconnection between battery cells being retained within one of the cell carriers, respectively. The busbars of a plurality of such cell assemblies are electrically interconnectable to provide an electrical interconnection between the battery cells of the battery module that are retained in different cell carriers.

In some embodiments, the battery module includes an adhesive to fix the battery cells within the cell retainers to provide efficient and cost-effective additional support to retain the battery cells within the retainers.

According to another embodiment of the present disclosure, a battery pack is provided including a plurality of the battery modules as described above. In other words, the battery pack includes a battery module with at least two cell carriers arranged adjacent to each other and including a first plurality of cell retainers and a second plurality of cell retainers. Each of the cell retainers is configured to retain (or hold) one of the battery cells in a form locking manner. The plurality of battery cells is arranged in the cell retainers. Each of the cell carriers includes at least two meandering ribs that are spaced apart from each other. The first plurality of cell retainers of one of the cell carriers is arranged between the at least two meandering ribs of said cell carrier, and the second plurality of cell retainers of said cell carrier is arranged between one of the at least two meandering ribs and a meandering rib of an adjacently arranged cell carrier. The modular and efficiently manufacturable battery module makes the battery pack similarly efficiently manufacturable. The battery pack and/or the battery modules of the battery pack may include any of the above-mentioned features.

Another embodiment of the present disclosure refers to an electric vehicle including a battery module as described above and/or a battery pack as described above. The modular and efficiently manufacturable battery module makes the battery pack and, thus, the vehicle similarly efficiently manufacturable. The electrical vehicle and/or the battery modules mounted therein may include any of the above-mentioned features.

Another embodiment of the present disclosure provides a cell carrier including a first plurality of cell retainers and a second plurality of cell retainers. Each of the cell retainers is configured to hold a battery cell in a form locking manner and includes at least two meandering ribs that are spaced apart from each other. The first plurality of cell retainers of the cell carrier is arranged between the at least two meandering ribs of said cell carrier, and the second plurality of cell retainers of said cell carrier is arranged opposite to the first plurality of cell retainers and is separated therefrom by one of the at least two meandering ribs. The cell carrier may be configured to include any of the above-mentioned features, such as features of the cell carrier, the meandering ribs, first plurality of cell retainers, and/or the second plurality of cell retainers.

Another embodiment of the present disclosure provides a cell assembly including: the cell carrier; a plurality of battery cells; and a busbar. The plurality of battery cells is arranged in the cell retainers, and the plurality of cells is electrically interconnected by the busbar. The cell assemblies are smaller in size than the entire battery module. Thus, the cell assembly is efficient to handle and requires a small manufacturing site. The cell assemblies are modular in size as described with reference to the cell carrier and easy to handle and, thus, assembly tolerances can be reduced compared to an example in which all of the battery cells of the entire battery module need to be equipped with a current collector structure in the same manufacturing site, such as due to laser welding. The modular design enables a smaller number of battery cells corresponding to the number of battery cells in a cell carrier to be electrically interconnected by the busbar. A plurality of cell assemblies may be arranged adjacent to each other to form the battery module. To manufacture the entire battery module, the cell assemblies are electrically interconnected by an interconnection arrangement, such as by screwing. Thus, the battery module can easily be dismounted, such as for service and maintenance, and welding can be applied only for the cell assemblies and may be in the entire (or overall) battery module. The cell assembly may be configured to include any of the above-mentioned features, including features of the cell carrier, the meandering ribs, first plurality of cell retainers, and/or the second plurality of cell retainers.

FIG. 1 is a schematic view of an electric vehicle 300 according to an embodiment of the present disclosure. The electric vehicle 300 is propelled by an electric motor 310 using energy stored in rechargeable batteries arranged in a battery pack 10. The battery pack 10 is a set of any number of battery modules 12. Rechargeable batteries are formed by the battery module 12 formed of a plurality of secondary battery cells 20. Components of the battery pack 10 include the individual battery modules 12 and interconnects 301, which provide electrical conductivity between the battery modules 12. Each of the battery modules 12 includes battery cells 20.

Figure 2:
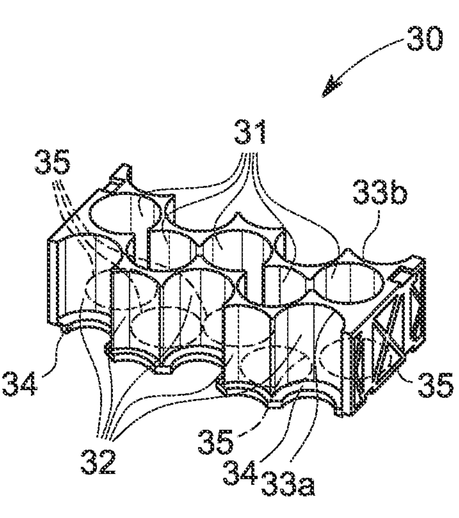
FIG. 2 id a perspective view of a cell carrier according to an embodiment of the present disclosure.

FIG. 2 is a perspective view of a cell carrier 30 according to an embodiment of the disclosure.

The cell carrier 30 includes two meandering ribs **33*a*, 33*b* that are spaced apart from each other. The cell carriers 30 and, thus, the meandering ribs 33*a*, 33*b*** are made of a polymer.

The cell carrier 30 includes a first plurality of cell retainers 31 and a second plurality of cell retainers 32. Each of the cell retainers 31, 32 is configured (e.g., shaped) to hold a battery cell 20 in a form locking manner. Each of the plurality of cell retainers 31, 32 includes five cell retainers 31, 32, but the present disclosure is not limited thereto.

The meandering ribs **33*a*, 33*b* delimit (e.g., form) the cell retainers 31, 32. For example, the surface of the cell retainers 31, 32 is formed by the meandering ribs 33***a*, 33*b*. The meandering ribs 33*a*, 33*b* provide the retainers 31, 32 in the form of cavities for accommodating the battery cells 20.

The first plurality of cell retainers 31 of the cell carrier 30 is arranged between the two meandering ribs 33*a*, 33*b*. The two meandering ribs 33*a*, 33*b* are arranged and shaped so that the first plurality of cell retainers 31 is meanderingly arranged between the two ribs 33*a*, 33*b*. The first plurality of cell retainers 31 is arranged in a first meandering row.

The two ribs 33*a*, 33*b* basically extend (e.g., generally or primarily extend) in a principal extension plane of the respective rib 33*a*, 33*b* while the meandering (e.g., undulating) ribs 33*a*, 33*b* alternatingly extend to either of the two opposite sides with respect the principal extension plane. Therein, each of the two meandering ribs 33*a*, 33*b* has a width that periodically changes along the ribs 33*a*, 33*b* to form the cell retainers 31, 32 in a meandering, undulating manner.

The second plurality of cell retainers 32 is arranged opposite to the first plurality of cell retainers 31 and is separated therefrom by one of the at least two meandering ribs 33*a*. For example, the second plurality of cell retainers 32 is separated from the first plurality of cell retainers 31 by the first meandering rib 33*a*. Thus, the second plurality of cell retainers 32 is arranged in a second meandering row that is separated from the first meandering row by the first meandering rib 33*a*.

Figures 4, 5, 6:
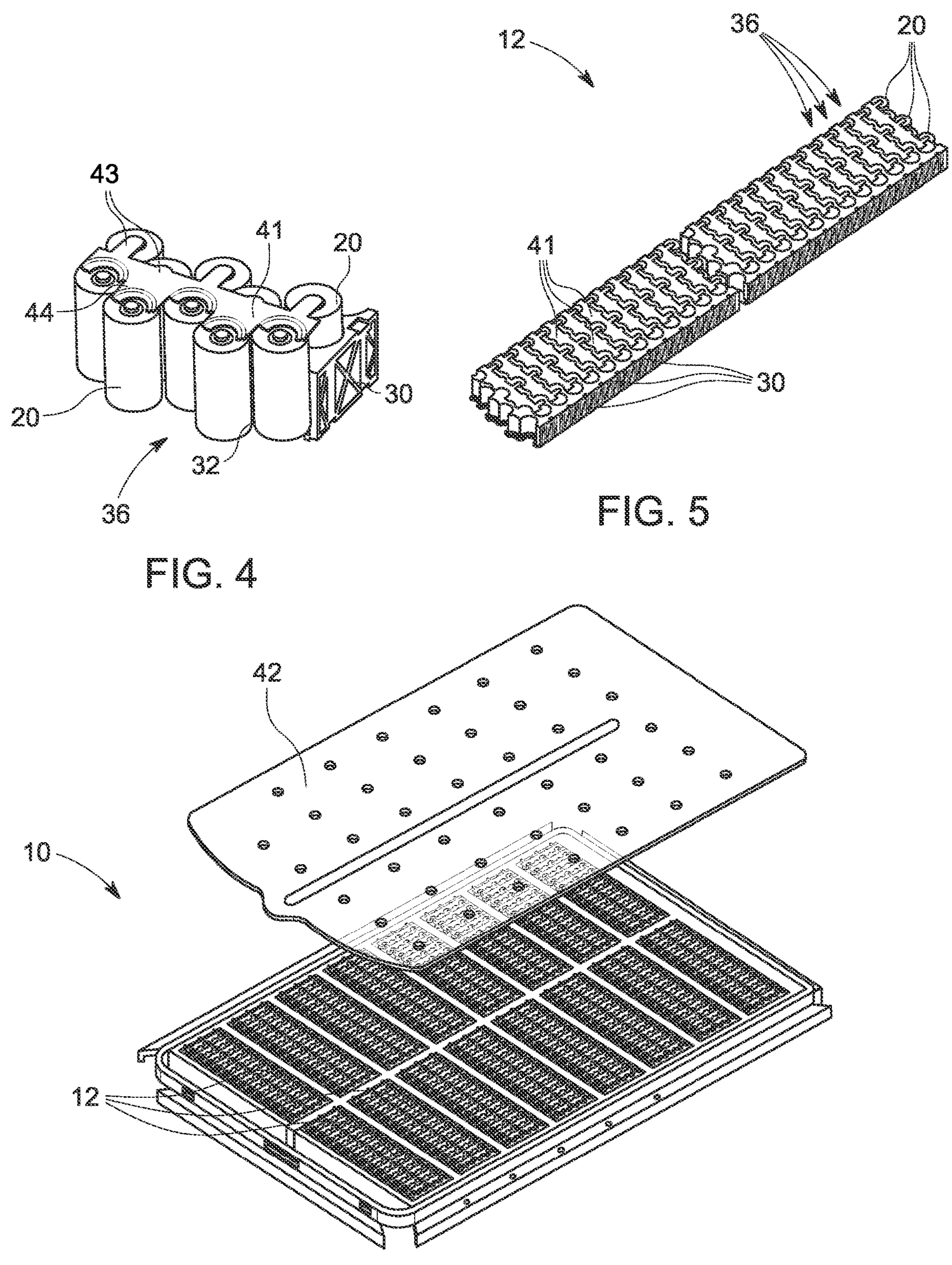
FIG. 4 is a perspective view of a cell assembly according to an embodiment of the present disclosure.
FIG. 5 is a perspective view of a battery module according to an embodiment of the present disclosure.
FIG. 6 is a perspective view of a battery pack according to an embodiment of the present disclosure.

Each of the first and second plurality of cell retainers 31, 32 is arranged in a meandering row so that a plurality of adjacently arranged rows form a hexagonal arrangement of cell retainers 31, 32 (see, e.g., FIGS. 5 and 6). Thus, the cell retainers 31, 32 are arranged in a hexagonal pattern.

Each of the cell retainers 31, 32 is cylindrically shaped and has a cylindrical through-hole 35 (as indicated with dashed lines in FIG. 2) or has a section (or portion) of a cylindrical through-hole. For example, each of the first plurality of cell retainers 31 has the through-hole 35, and each of the second plurality of cell retainers 32 is formed as a cylinder segment and has a corresponding opening in the form (e.g., shape) of a section of the through-hole 35, which will also be referred to as the through-hole 35. Each of the retainers 31, 32 includes a projection 34 to prevent the battery cells 20 held therein from moving, in particular along their cylindrical axes. Each of the projections 34 is ring-shaped to effectively reduce the diameter of the respective through-hole 35 and/or the cell retainers 31, 32. For example, each of the projections 34 of the first plurality of cell retainers 31 is O-ring-shaped, and each of the projections 34 of the second plurality of cell retainers 32 is shaped as a segment of an O-ring.

The first plurality of cell retainers 31 includes a plurality of connected cell retainers 31. For example, the cell carrier 30 is shaped so that each of the first plurality of cell retainers 31 is shaped as a cylinder segment, and a circumferential section (or portion) of each of the cell retainer 31 is open to connect to (e.g., to communicate with) an adjacent cell retainer 31 of the first plurality of cell retainers 31. Thus, the first plurality of cell retainers 31 includes a meandering row of interconnected cell retainers 31.

Similarly, the second plurality of cell retainers 32 includes a plurality of connected cell retainers 32. For example, the cell carrier 30 is shaped so that each of the second plurality of cell retainers 32 is shaped as a cylinder segment, and a circumferential section of each of the cell retainers 32 is open connect to (e.g., to communicate with) an adjacent cell retainer 32 of the second plurality of cell retainers 32. Thus, the second plurality of cell retainers 32 includes a meandering row of interconnected cell retainers 32.

The cell carrier 30 is stackable so that a battery module 12 may include a plurality of stacked cell carriers 30.

Each of the cell carriers 30 includes an even number of cell retainers 31, 32 while the cell carrier 30 includes an odd number of the first cell retainers 31 and an odd number of the second cell retainers 32. In total, the cell carrier 30 comprises ten cell retainers 31, 32, but the present disclosure is not limited thereto.

Figure 3:
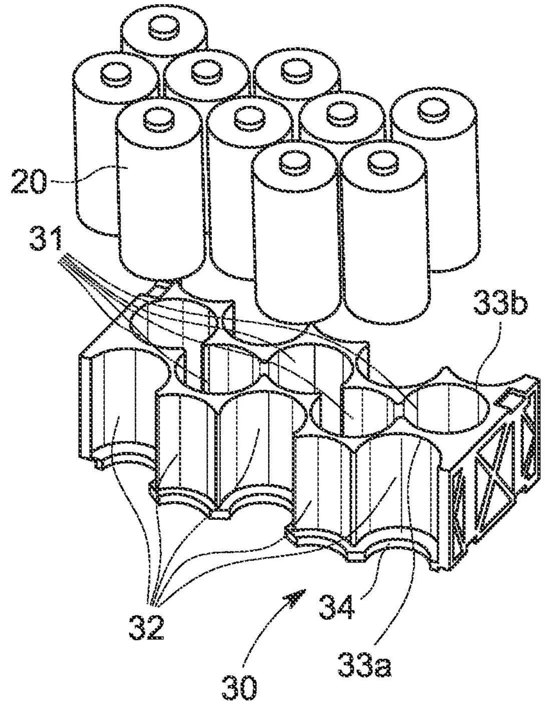
FIG. 3 is a perspective view of the cell carrier shown in FIG. 2 with a plurality of battery cells according to an embodiment of the present disclosure.

FIG. 3 is a perspective view of the cell carrier 30 shown in FIG. 2 and a plurality of battery cells 20 according to an embodiment of the present disclosure.

Each of the battery cells 20 has a cylindrical shape. The shape of the battery cells 20 match (or correspond to) the shape of the cell retainers 31, 32 such that the battery cells 20 can fixed by and within the cell retainers 31, 32. The battery cells 20 can be mounted to the cell carrier 30 by inserting them along their respective cylinder axis into the cell retainers 31, 32. Each of the cell retainers 31, 32 includes the projection 34 that is dimensioned so that the battery cells 20 are prevented from moving through (e.g., from falling out through) the through-holes 35 in the cell retainers 31, 32. To improve fastening of the battery cells 20 within the cell retainers 31, 32, the battery module 12 may include an adhesive. The adhesive can be applied to the surfaces that delimit the cell retainers 31, 32 and/or to the projections 34.

In one embodiment, the diameter of the battery cells 20 and/or of the cell retainers 31, 32 is at least 30 mm and may be at least 32 mm.

FIG. 4 is a perspective view of a cell assembly 36 according to an embodiment of the present disclosure.

The cell assembly 36 includes the cell carrier 30, as shown in FIGS. 1-3 and described with reference thereto, the plurality of battery cells 20, as shown in FIG. 3 and described with reference thereto, and a busbar 41.

The plurality of battery cells 20 is arranged in the cell retainer 31, 32 of the cell carrier 30, as described with reference to FIG. 3.

The plurality of battery cells 20 is electrically interconnected by the busbar 41, which is welded to the battery cells 20 to electrically interconnect the battery cells 20 with each other.

The busbar 41 includes a plurality of connection members 43, each of which is configured and arranged to electrically connect to a terminal of one of the battery cells 20 retained by the first plurality of cell retainers 31. The connection members 43 are arranged in a meandering row corresponding to the meandering row of the first plurality of cell retainers 31.

The busbar 41 includes a covering section 44 configured and arranged to connect to a plurality of battery cell casings, also called housings, of the battery cells 20. The covering section 44 is arranged in a meandering manner to correspond to the meandering row of the second plurality of cell retainers 32.

A 5*p* connection is shown in the illustrated embodiment, with the battery cells 20 placed into the cell carrier 30 and the busbar 41 welded with its covering section 44 on a negative potential on the shoulder of one row (e.g., on the battery cells 20 retained by the second plurality of cell retainers 32) and with the connection members 43 on the positive terminals on another row (e.g., on the battery cells 20 retained by the first plurality of cell retainers 31).

A plurality of cell assemblies, such as is shown in FIG. 4, can be stacked together to form a battery module 12 as shown in FIG. 5 and described with reference thereto.

FIG. 5 is a perspective view of a battery module 12 according to an embodiment of the present disclosure.

The battery module 12 shown in FIG. 5 includes a plurality of cell assemblies 36, as shown in FIG. 4 and described with reference thereto, and includes a plurality of cell carriers 30, as shown in FIGS. 1-3 and as explained with reference thereto.

The cell assemblies 36 and, thus, the cell carriers 30 are arranged side-by-side in a stacked manner so that the battery module 12 is built from stacked cell assemblies 36. The plurality of battery cells 20 is arranged in a hexagonal pattern.

The battery module 12 may be assembled as follows. The plurality of battery cells 20 and the plurality of cell carriers 30 is provided. The plurality of battery cells 20 is arranged in the cell retainers 31, 32 of one of the cell carriers 30. The busbar 41 is welded (e.g., by laser welding) to the battery cells 20, as shown in FIG. 4 and described with reference thereto. Thus, the cell assemblies 36 are manufactured. The above is performed for each of the plurality of cell assemblies 36. The plurality of cell assemblies 36 is arranged adjacent to each other (e.g., stacked onto each other) to form the battery module 12. To provide an electrical connection between the different cell assemblies 36, the busbars 41 of the plurality of cell assemblies 36 are electrically interconnected by an interconnection arrangement (e.g., by screwing).

A plurality of battery modules 12, as shown in FIG. 5 and described with reference thereto, are arranged together to form a battery pack 10 as shown in FIG. 6.

FIG. 6 is a perspective view of a battery pack according to an embodiment of the present disclosure.

The battery pack 10 includes a plurality of battery modules 12, as described with reference to FIG. 5. The battery pack 10 includes a removable bottom cover 42 for the battery modules 12.

Figure 7A:
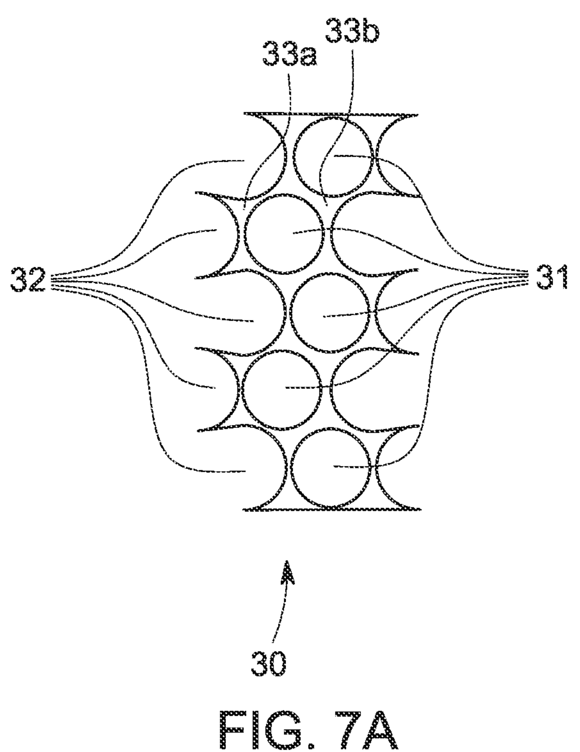
FIGS. 7A and 7B are schematic top views of a plurality of adjacently arranged cell carriers according to an embodiment of the present disclosure.
Figure 7B:
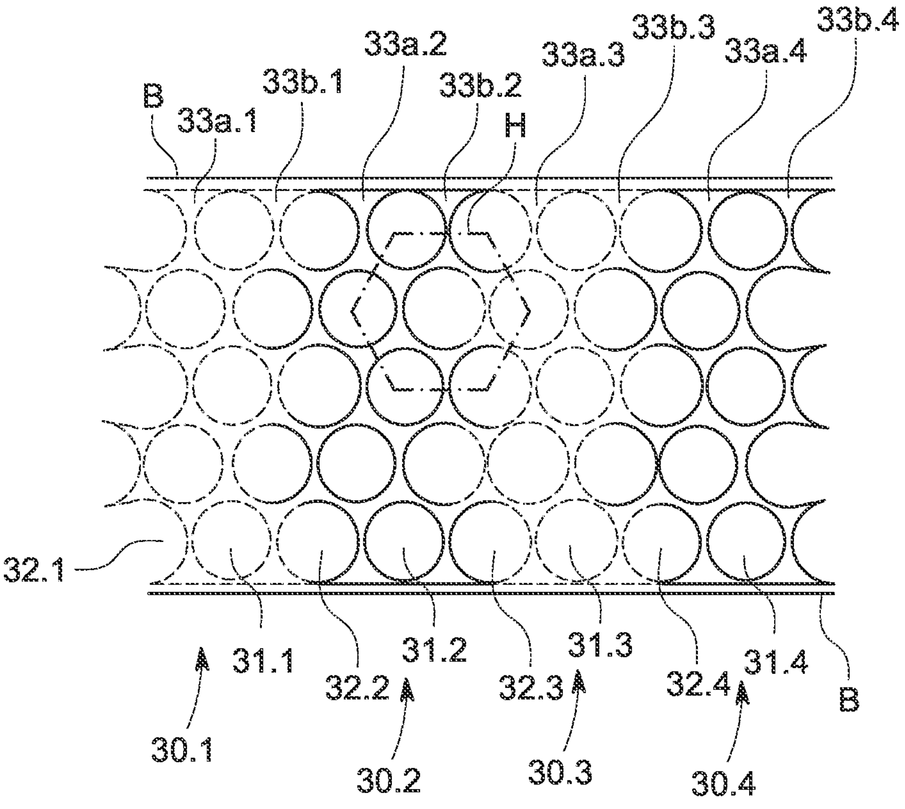

FIGS. 7A and 7B illustrate a schematic top view of a plurality of adjacently arranged cell carriers 30 according to the embodiment shown in FIG. 2. The cell carriers 30 are the same as those illustrated in FIG. 2 and described with reference thereto. FIGS. 7A and 7B illustrate the hexagonal arrangement of the first cell retainers 31 and the second cell retainers 32 in which battery cells 20 are to be retained.

For reference, the cell carrier 30, as illustrated in FIG. 2, is illustrated in FIG. 7A in a schematic top view, while the projections 34 of the cell carrier 30 are not shown for the sake of simplicity.

FIG. 7B illustrates four cell carriers 30.1, 30.2, 30.3, 30.4 arranged adjacent to each other, while the projections 34 of the cell carriers 30 are not shown for the sake of simplicity. Only one of the first cell retainers 31.1, 31.2, 31.3, 31.4 and one of the second cell retainers 32.1, 32.2, 32.3, 32.4 is indicated for each of the cell carriers 30.1, 30.2, 30.3, 30.4. To distinguish adjacently arranged cell carriers 30.1, 30.2, 30.3, 30.4 from each other, the cell carriers 30.1, 30.2, 30.3, 30.4 are alternatingly indicated with a solid line or a dashed line.

For example, regarding cell carrier 30.2, each of the first cell retainers 31.2 is arranged in a meandering row and is indicated by a circle with a solid line, and each of the second cell retainers 32.2 is arranged in a meandering row and is indicated by a circle with a line which is half solid. The first cell retainers 31.2 and the second cell retainers 32.2 are separated from each other by a meandering rib **33*a*.2. The first cell retainers 31.3 and the second cell retainers 32.3 of the adjacent cell carrier 30.3, indicated by dashed lines, are separated from each other by a meandering rib 33*a*.3. The second cell retainers 32.1 and the first cell retainers 31.1 of the adjacent cell carrier 30.1, indicated by dashed lines, are separated from each other by a meandering rib 33*a*.1. The above configuration may be repeated analogously for any of the cell carriers 30.1, 30.2, 30.3, 30.4**.

A boundary B is indicated, merely for illustrative purposes, that represents a section of the exterior contour of the four cell carriers 30.1, 30.2, 30.3, 30.4. The cell retainers 31.1, 31.2, 31.3, 31.4, 32.1, 32.2, 32.3, 32.4, which are not adjacent to the boundary B of the adjacently arranged cell carriers 30.1, 30.2, 30.3, 30.4, are arranged in a hexagonal pattern (e.g., each of the cell retainers 31.1, 31.2, 31.3, 31.4, 32.1, 32.2, 32.3, 32.4, which are not located adjacent to the boundary B of the adjacently arranged cell carriers 30.1, 30.2, 30.3, 30.4 has six adjacently arranged cell retainers 31.1, 31.2, 31.3, 31.4, 32.1, 32.2, 32.3, 32.4).

A hexagon H is indicated with a dash-dotted line to illustrate the hexagonal pattern in which the cell retainers 31.1, 31.2, 31.3, 31.4, 32.1, 32.2, 32.3, 32.4 are arranged. The hexagon H is not physically present but is indicated only to illustrate the arrangement of the cell retainers 31.1, 31.2, 31.3, 31.4, 32.1, 32.2, 32.3, 32.4. The hexagon H at the illustrated position illustrates the second cell retainer 32.3 of the cell carrier 30.3 being arranged in the center of the hexagon H and having six neighboring cell retainers 31.2, 31.3, 32.3, namely three first cell retainers 31.2 of the adjacently arranged cell carrier 30.2, one first cell retainer 31.3 of said cell retainer 30.3 and two second cell retainers 32.3 of said cell retainer 30.3. The above consideration can be repeated analogously for any of the cell retainers 31.1, 31.2, 31.3, 31.4, 32.1, 32.2, 32.3, 32.4, which are not located adjacent to the boundary B of the adjacently arranged cell carriers 30.1, 30.2, 30.3, 30.4.

Thus, each of the first and second plurality of cell retainers 31.1, 31.2, 31.3, 31.4, 32.1, 32.2, 32.3, 32.4, except for the cell retainers 31.1, 31.2, 31.3, 31.4, 32.1, 32.2, 32.3, 32.4 at the boundary B of the cell carriers 30.1, 30.2, 30.3, 30.4, is arranged in a meandering row so that a plurality of adjacently arranged rows form a hexagonal arrangement of cell retainers 31.1, 31.2, 31.3, 31.4, 32.1, 32.2, 32.3, 32.4.

SOME REFERENCE SIGNS

10 battery pack
12 battery module
20 battery cell
30, 30.1, 30.2, 30.3, 30.4 cell carrier
31, 31.1, 31.2, 31.3, 31.4 first cell retainer
32, 32.1, 32.2, 32.3, 32.4 second cell retainer
**33*a*, 33*a*.1, 33*a*.2, 33*a*.3, 33*a*.4** meandering rib
**33*b*, 33*b*.1, 33*b*.2, 33*b*.3, 33*b*.4** meandering rib
34 projection
35 through-hole
36 cell assembly
41 busbar
42 bottom cover
43 connection member
44 covering section
300 vehicle
301 interconnects
310 motor
B boundary
H hexagon

What is claimed is:

1. A battery module comprising:

a plurality of cylindrical battery cells; and a plurality of cell carriers arranged adjacent to each other, each of the cell carriers comprising:

a plurality of meandering ribs that are spaced apart from each other;

a first plurality of cell retainers adjacent to each other along a meandering row; and a second plurality of cell retainers adjacent to each other along a meandering row, each of the second plurality of cell retainers having a partially cylindrical shape, wherein each of the first plurality of cell retainers and the second plurality of cell retainers is configured to hold one of the cylindrical battery cells in a form locking manner, wherein the cylindrical battery cells are in the cell retainers, wherein the first plurality of cell retainers of one of the cell carriers is arranged between the meandering ribs of the one of the cell carriers, and the second plurality of cell retainers of the one of the cell carriers is arranged between one of the meandering ribs of the one of the cell carriers and a meandering rib of an adjacently arranged cell carrier, and wherein adjacent ones of the second plurality of cell retainers along the meandering row have different cylindrical extents.

2. The battery module according to claim 1, wherein the meandering ribs of each of the cell carriers are arranged so that the first plurality of cell retainers therein is meanderingly arranged between the meandering ribs.

3. The battery module according to claim 1, wherein the meandering ribs of each one of the cell carriers are arranged so that the second plurality of cell retainers of the cell carriers is meanderingly arranged between one of the meandering ribs and one of the meandering ribs of an adjacently arranged second one of the cell carriers.

4. The battery module according to claim 1, wherein the meandering ribs of each of the cell carriers are arranged so that the second plurality of cell retainers of the cell carriers is meanderingly arranged opposite to the first plurality of cell retainers and is separated therefrom by one of the meandering ribs.

5. The battery module according to claim 1, wherein the plurality of cylindrical battery cells is arranged in a hexagonal pattern.

6. The battery module according to claim 1, wherein each of the first and second plurality of cell retainers is arranged in a meandering row so that a plurality of adjacently arranged rows form a hexagonal arrangement of the cell retainers.

7. The battery module according to claim 1, wherein each of the cell carriers is stackable, and wherein the battery module comprises a plurality of stacked ones of the cell carriers.

8. The battery module according to claim 1, wherein each of the cell retainers has a cylindrical through-hole.

9. The battery module according to claim 8, wherein each of the cell retainers comprises a projection.

10. The battery module according to claim 1, wherein each of the cell carriers has an even number of cell retainers.

11. The battery module according to claim 10, wherein each of the cell carriers has ten, fourteen, or eighteen cell retainers.

12. The battery module according to claim 1, wherein at least some of the cylindrical battery cells retained in one of the cell carriers are electrically interconnected by a busbar.

13. The battery module according to claim 1, wherein the battery module comprises an adhesive to fix the cylindrical battery cells within the cell retainers.

14. A battery pack comprising a plurality of the battery modules according to claim 1.

15. An electric vehicle comprising the battery module according to claim 1.

16. An electric vehicle comprising the battery pack according to claim 14.

17. A cell carrier comprising:

a first meandering rib and a second meandering rib spaced apart from each other, wherein the first meandering rib and the second meandering rib together form:

a first plurality of cylindrical cell retainers between inner, facing surfaces of the first meandering rib and the second meandering rib; and a second plurality of partially cylindrical cell retainers on outer surfaces of each of the first meandering rib and the second meandering rib, wherein each of the cell retainers is configured to hold a battery cell in a form locking manner, wherein even ones of the second plurality of partially cylindrical cell retainers on the outer surface of the first meandering rib form less than half of a cylindrical shape and odd ones of the second plurality of partially cylindrical cell retainers on the outer surface of the first meandering rib form more than half of a cylindrical shape, wherein odd ones of the second plurality of partially cylindrical cell retainers on the outer surface of the second meandering rib form less than half of a cylindrical shape and even ones of the second plurality of partially cylindrical cell retainers on the outer surface of the second meandering rib form more than half of a cylindrical shape.

18. A cell assembly comprising:

the cell carrier as claimed in claim 17;

a plurality of battery cells; and a busbar, wherein the plurality of battery cells is arranged in the cell retainers, and wherein the plurality of battery cells is electrically interconnected by the busbar.

* * * * *